US005655751A

United States Patent [19]

Cho

[11] Patent Number: 5,655,751

[45] Date of Patent: Aug. 12, 1997

[54] OIL DRAIN DEVICE FOR VALVE SPOOL CAP

[75] Inventor: Hyung Joon Cho, Changwon, Rep. of Korea

[73] Assignee: Samsung Heavy Industries Co., Ltd., Seoul, Rep. of Korea

[21] Appl. No.: 497,345

[22] Filed: Jun. 30, 1995

[30] Foreign Application Priority Data

Sep. 29, 1994 [KR] Rep. of Korea ........................ 94-24708
Sep. 29, 1994 [KR] Rep. of Korea ........................ 94-24710

[51] Int. Cl.[6] .......................................................... F16K 1/00

[52] U.S. Cl. .............................................. 251/333; 251/359

[58] Field of Search .................................... 251/333, 319, 251/320, 321, 359

[56] References Cited

U.S. PATENT DOCUMENTS 2,255,404 9/1941 White et al. ........................ 251/333 X
4,610,424 9/1986 Koppers et al. ..................... 251/333 X

*Primary Examiner*—Kevin Lee
*Attorney, Agent, or Firm*—Kenyon & Kenyon

[57] ABSTRACT

A device for draining oil out of a valve spool cap is disclosed. The device makes the oil start to drain out of the spool cap just after the valve spool starts to move thereby remarkably improving the responsibility of the spool. The valve body has either an enlarged inner diameter portion formed in the bore or a drain hole extending in the body for making the drain core communicate with the inside of the spool cap. The enlarged inner diameter portion is formed by partially enlarging the inner diameter of the bore between the drain core and the end wall of the valve body. The drain hole extends in the valve body from the drain core to the end wall of the valve body.

3 Claims, 4 Drawing Sheets

OIL DRAIN DEVICE FOR VALVE SPOOL CAP

BACKGROUND OF THE INVENTION

1. Field of the Invention

The present invention relates in general to devices for draining oil out of a valve spool cap and, more particularly, to a structural improvement in such devices for rapidly draining the oil out of the valve spool cap and thereby improving responsibility of the valve spool.

2. Description of the Prior Art

With reference to FIG. 1, there is shown a valve with a typical oil drain device. As shown in this drawing, the valve includes a spool cap 103 for receiving an end of a valve spool 102 extending to the outside of a valve body 101. In the spool cap 103, the valve spool 102 is biased by a spring 104 at a given spring force. The spool cap 103 is filled with oil.

In order to move the spool 102 in the direction of arrow "a" of FIG. 1, the oil in chamber "A" of the spool cap 103 should be rapidly drained. The device for draining the oil in the valve is formed by a gap which is selectively defined between the interior end wall of the cap 103 and a spring guide 105 when applying pilot pressure to the spring guide 105. The oil in chamber A is drained to a drain tank (not shown) through the gap and through a drain line B.

However, the above oil drain device has a problem that the desired rapid responsibility of the spool 102 in response to the pilot pressure can not be achieved due to both the weight of the spool 102 and the negative pressure in the line B. That is, the above oil drain device can not achieve rapid oil draining even though the oil should be rapidly drained out of the spool cap 103 in order for improving the responsibility of the spool 102. In this regard, the typical valve needs relatively large pilot pressure in order to move the spool.

Japanese Patent Laid-open Publication Nos. Sho. 62-2004, 62-24079 and 62-48080 disclose use of a so-called "drain core" in the valve for rapidly draining the oil out of the spool cap and thereby improving the responsibility of the spool. As shown in FIG. 2A, each of the prior art valves include a groove 203 which is formed on a spool 202 to form a given gap between the exterior wall of the spool 202 and the interior wall of a valve body 201. The drain core 204 for directly draining the oil to the drain tank is formed in the valve body 201 such that the drain core 204 is opposed to the groove 203. In the above prior art valves, when a spring guide 205 moves rightward in the drawing as a result of movement by the spool 202 in the direction of arrow "a", the oil in the spool cap 206 flows in the space defined between the end wall of the spring guide 205 and the valve body 201 in the spool cap 206 and flows in the groove 203 of the spool 202, and in turn is drained to the drain tank through the drain core 204 as shown in FIG. 2B. However, each of the prior art valves has a problem that each valve has a time delay in oil draining due to the fact that the intended drain function is not activated until the spool 202 moves by at least the distance "1" by shifting the portion of groove 203 into the spool cap 206 and thereby making the inside of the spool cap 206 communicate with the drain core 204 of the body 201. Due to the time delay, the prior art valves can not achieve the desired responsibility of the spools.

SUMMARY OF THE INVENTION

It is, therefore, an object of the present invention to provide a device for draining oil out of a valve spool cap in which the above problems can be overcome and which makes the oil start to drain out of the spool cap just after the valve spool starts moving and thereby remarkably improves the responsibility of the spool.

In an embodiment, the invention provides a device for draining oil out of a valve spool cap comprising a drain core formed in a valve body for rapidly draining the oil out of the spool cap, wherein the valve body includes: an enlarged inner diameter portion formed by partially enlarging the inner diameter of a bore of the valve body in a region between the drain core and an end wall of the valve body opposed to the spool cap such that a gap is defined between the interior wall of the bore and the exterior wall of a valve spool received in the bore, the gap making the inside of the spool cap communicate with the drain core Just after the spool starts moving.

In another embodiment, the invention provides a device for draining oil out of a valve spool cap comprising a drain core formed in a valve body for rapidly draining the oil out of the spool cap, wherein the valve body includes: a drain hole extending in the valve body from the drain core to an end wall of the valve body opposed to the spool cap and thereby making the drain core communicate with the inside of the spool cap and making the oil drain out of the spool cap into the drain core through the drain hole just after the spool starts moving.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
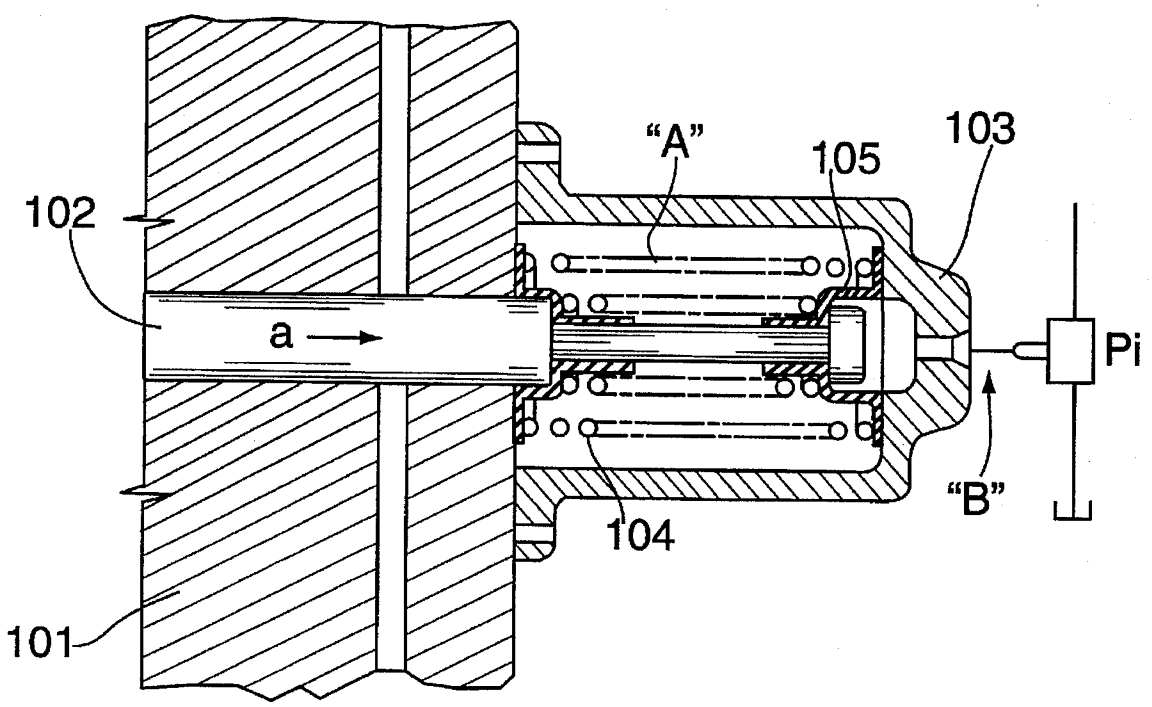
FIG. 1 PRIOR ART
FIG. 1 is a sectional view of a typical valve.
Figure 2A:
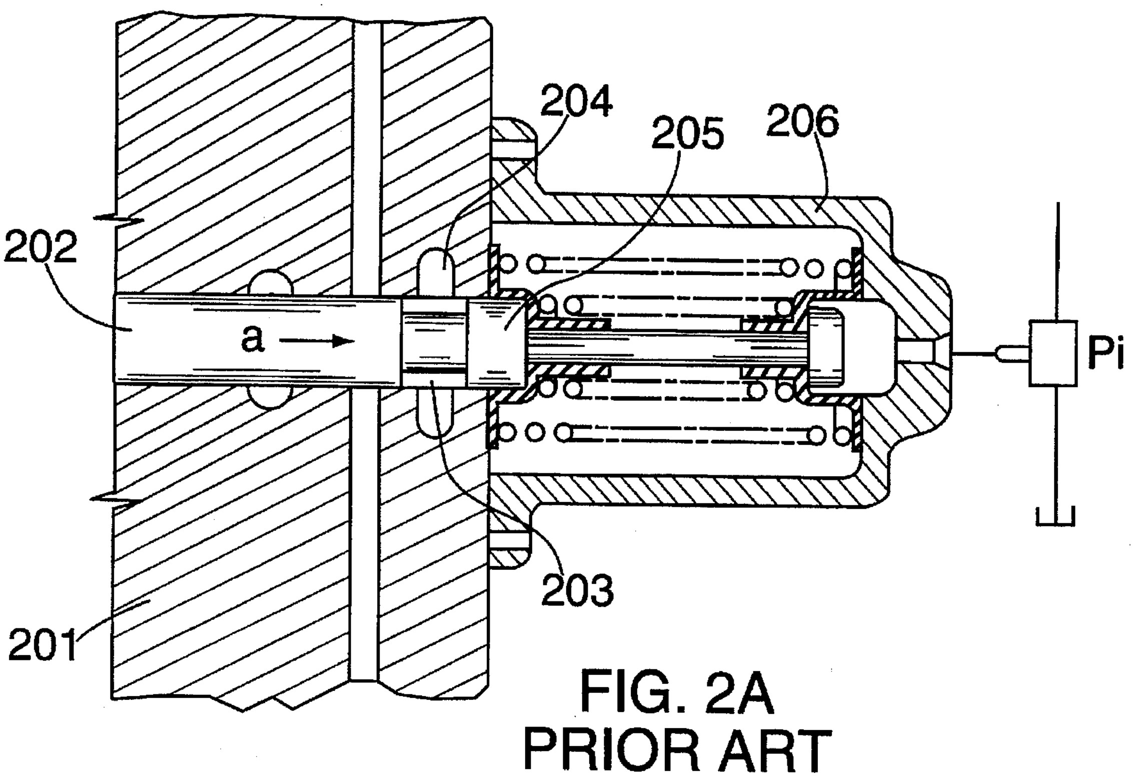
FIG. 2A PRIOR ART
FIG. 2A is a sectional view of a typical valve with a so-called "drain core"
Figure 2B:
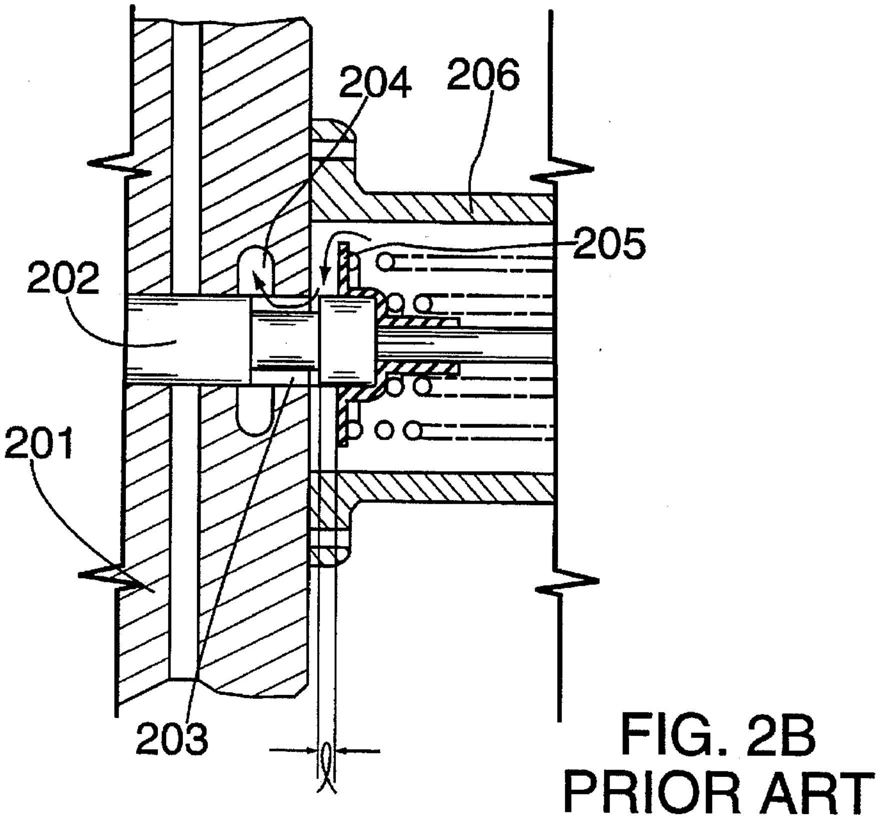
FIG. 2B PRIOR ART
FIG. 2B is a sectional view of the valve of FIG. 2A, showing oil draining out of valve spool cap through the drain core.

Please note that the general structure of the valve, interior structure of the valve spool cap and drain core structure are common with those of the prior art valves shown in FIGS. 1, 2A and 2B and further explanation for the elements common to both the valve of this invention and the prior art valves is thus deemed unnecessary.

Figure 3A:
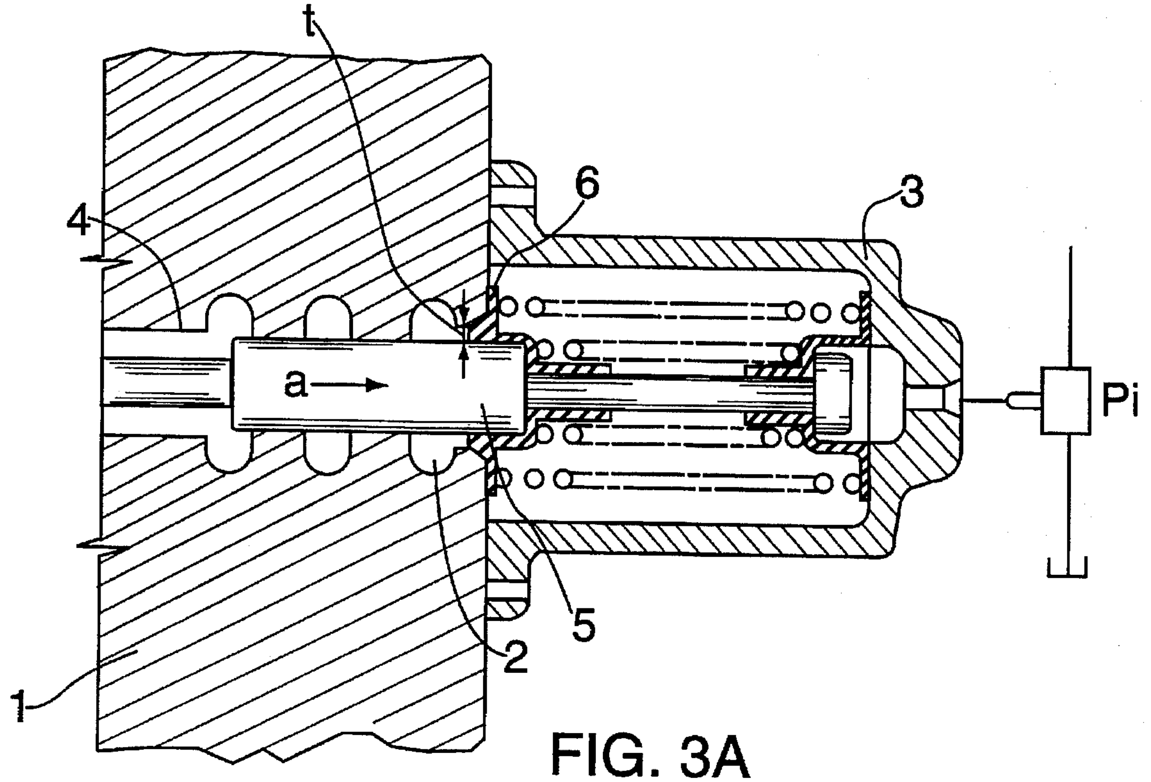
FIG. 3A is a sectional view of a valve with an oil drain device in accordance with a primary embodiment of the invention.

FIG. 3A is a sectional view of a valve provided with an oil drain device in accordance with a primary embodiment of the invention. In order to form the oil drain device, a gap "t" is defined between the interior wall of a bore 4 and the exterior wall of a valve spool 5 by forming an enlarged inner diameter portion in a valve body 1. The enlarged inner diameter portion is formed by partially enlarging the inner diameter of the bore 4 to be bigger than the outer diameter of the spool 5 within the region between a drain core 2 and an end wall of the valve body 1 opposed to a spool cap 3. In the present invention, it is preferred to form a first slope surface s1 of an inclination angle in the end wall of the valve body 1 and to form a second slope surface s2, having an inclination angle equal to the inclination angle of the first slope surface s1, in an opposed end of a spring guide 6 contacting with the first slope surface s1.

Figure 3B:
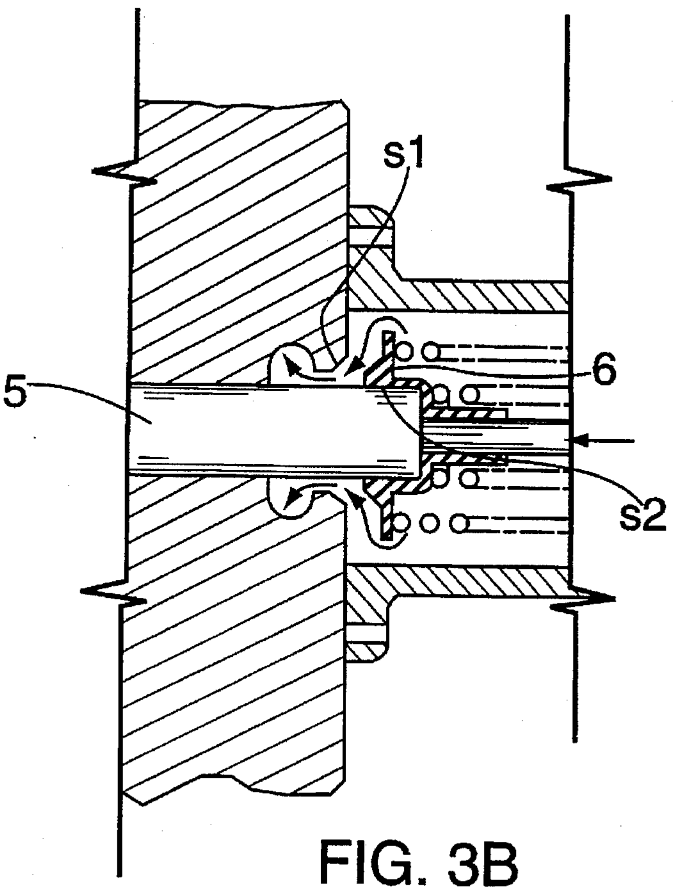
FIG. 3B is a sectional view of the valve of FIG. 3A, showing oil flowing out of a spool cap into a drain core through a gap defined between a spring guide and an end wall of valve body and through a gap defined between the interior wall of a bore and the exterior wall of a valve spool.

In the operation of the above oil drain device of the primary embodiment, the interior of the spool cap 3 can communicate with the drain core 2 just after the spool 5 starts to move in the direction of arrow "a" as shown in FIG. 3B. The movement of spool 5 in the direction of arrow "a" is accompanied with movement of the spring guide 6 in the direction of arrow "a" so that the gap between the slope surface s1 of the body 1 and the slope surface s2 of the spring guide 6 is enlarged. The oil in the spool cap 3 flows into the drain core 2 through the gap between the slope surfaces s1 and s2 and through the gap "t" between the interior wall of the bore 4 and the exterior wall of the spool 5 and in turn is drained to a drain tank (not shown). In this valve with the slope surfaces s1 and s2, the oil flows more smoothly out of the spool cap 3 into the drain core 2 due to the presence of slope surfaces s1 and s2.

Figure 4A:
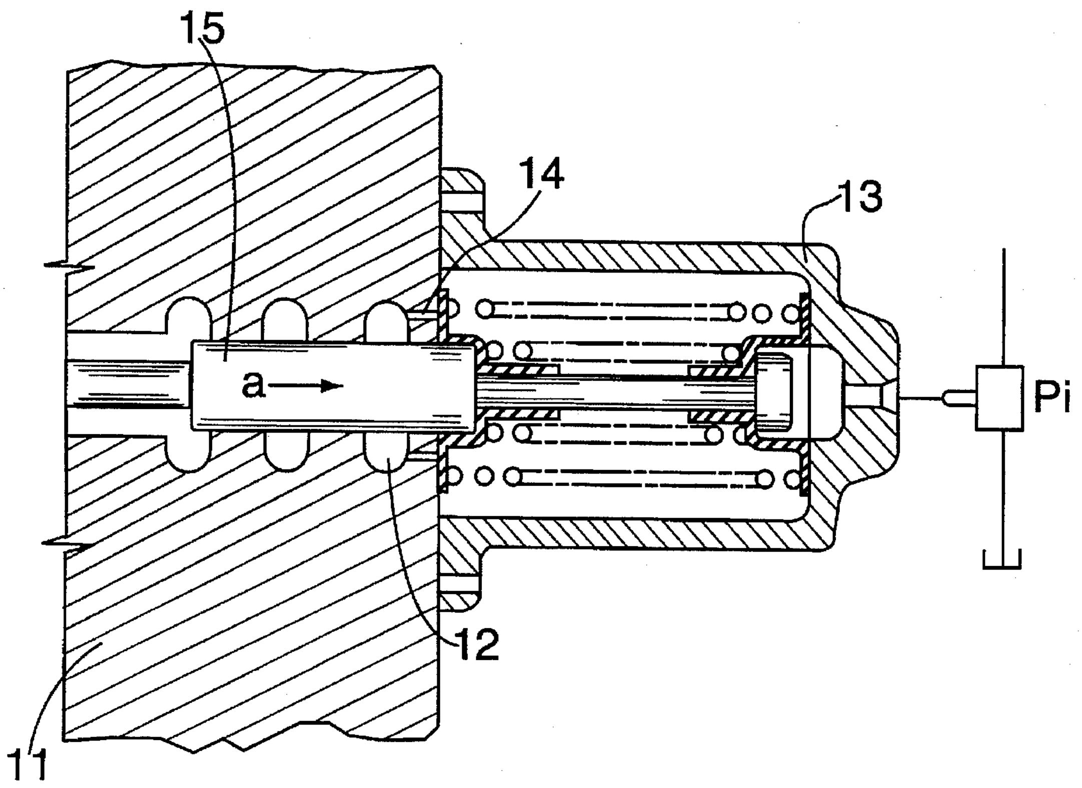
FIG. 4A is a sectional view of a valve with an oil drain device in accordance with a second embodiment of the invention.
Figure 4B:
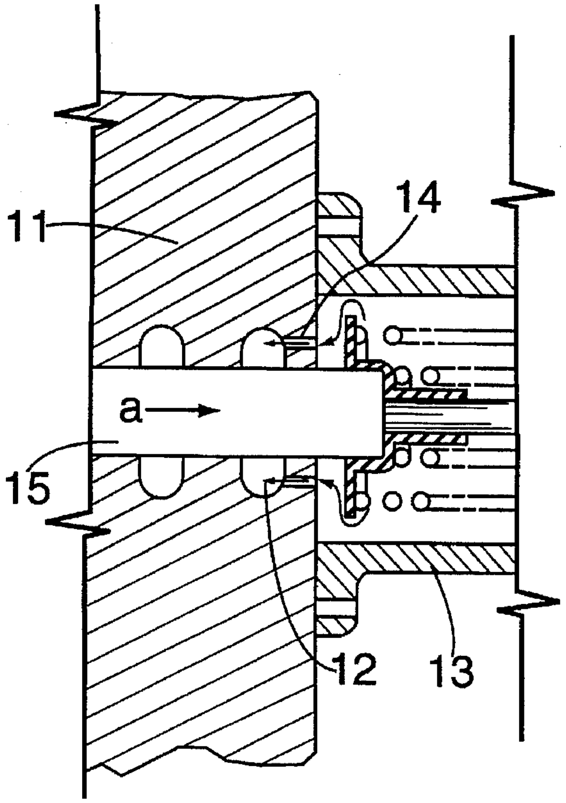
FIG. 4B is a sectional view of the valve of FIG. 4A, showing oil flowing out of the spool cap into a drain core through a gap defined between a spring guide and an end wall of a valve body and through a drain hole extending in the valve body from the drain core to the end wall of the valve body.

FIG. 4A shows a valve with an oil drain device in accordance with a second embodiment of the invention. The oil drain device of this embodiment includes a drain hole 14 which extends in a valve body 11 from a drain core 12 to an end wall of the body 11 opposed to a spool cap 13. The drain hole 14 thus makes the drain core 12 communicate with the inside of the spool cap 13.

In operation of the above oil drain device of the second embodiment, the oil in the spool cap 13 flows into the drain core 12 through the drain hole 14 just after the spool 15 starts to move. The oil in turn is drained to a drain tank (not shown). The movement of spool 15 in the direction of arrow "a" is accompanied with movement of spring guide 16 in the direction of arrow "a" so that a gap is formed between the end wall of the body 11 and the opposed surface of the spring guide 16 and gradually enlarged. The oil in the spool cap 13 thus flows into the drain hole 14 through the enlarged gap between the valve body 11 and the spring guide 16 and in turn is drained to the drain tank (not shown).

As described above, the invention provides a device for draining oil out of valve spool cap which makes the oil start to drain out of the spool cap just after the valve spool starts moving and thereby remarkably improving the responsibility of the spool. Apparatus having the valve with the instant oil drain device will thus achieve precise and rapid operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for draining oil out of a valve spool cap through a drain core formed in a valve body adjacent the valve spool cap for rapidly draining the oil out of the valve spool cap, the valve body including a bore leading to the valve spool cap, and a valve spool being movably mounted in the bore, the device comprising:

an enlarged inner diameter portion formed by partially enlarging an inner diameter of the bore of the valve body in a region between said drain core and an end wall of the valve body adjacent the spool cap such that a gap is defined between an interior wall of said bore and an exterior wall of the valve spool received in said bore, said gap allowing the inside of the valve spool cap to communicate with said drain core just after start of movement of said valve spool for draining oil out of the valve spool cap.

2. The device according to claim 1, further includes:

a first slope surface of an inclination angle formed in the end wall of the valve body; and a second slope surface formed in the opposed end of a spring guide, said second slope surface having an inclination angle equal to that of the first slope surface.

3. A device for draining oil out of a valve spool cap through a drain core formed in a valve body adjacent the spool cap for rapidly draining the oil out of the valve spool cap, the valve body including a bore leading to the valve spool cap, and a spool being movably mounted in the bore, the device comprising:

a drain hole extending in the valve body from said drain core to an end wall of the valve body adjacent the spool cap and thereby allowing the drain core to communicate with the inside of the spool cap and allowing the oil to drain out of the spool cap into the drain core through said drain hole just after said spool starts moving.

* * * * *